(12) United States Patent
Mozak et al.

(10) Patent No.: US 7,647,476 B2
(45) Date of Patent: Jan. 12, 2010

(54) COMMON ANALOG INTERFACE FOR MULTIPLE PROCESSOR CORES

(75) Inventors: Christopher Mozak, Beaverton, OR (US); Jeffrey D. Gilbert, Portland, OR (US); Ganapati Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/374,708

(22) Filed: Mar. 14, 2006

(65) Prior Publication Data

US 2007/0220233 A1    Sep. 20, 2007

(51) Int. Cl.
*G06F 7/38* (2006.01)
*G06F 13/14* (2006.01)
*G11C 7/10* (2006.01)

(52) U.S. Cl. .................. 712/200; 710/305; 365/189.02; 365/189.18

(58) Field of Classification Search .................. 712/200; 710/365; 365/189.02, 189.18
See application file for complete search history.

(56) References Cited

U.S. PATENT DOCUMENTS

| | | | | |
|---|---|---|---|---|
| 4,389,710 A * | 6/1983 | Rasmussen | .................. | 701/76 |
| 4,606,044 A * | 8/1986 | Kudo | ...................... | 379/22.02 |
| 4,698,753 A * | 10/1987 | Hubbins et al. | ............. | 709/209 |
| 4,803,618 A * | 2/1989 | Ita et al. | ...................... | 711/147 |
| 5,038,143 A * | 8/1991 | Hester | ........................ | 341/110 |
| 6,009,488 A | 12/1999 | Kavipurapu | ................ | 710/105 |
| 6,090,650 A * | 7/2000 | Dabral et al. | ............... | 438/195 |
| 6,253,290 B1 * | 6/2001 | Nakamoto | ................... | 711/138 |
| 6,725,317 B1 * | 4/2004 | Bouchier et al. | ............ | 710/312 |
| 6,836,813 B1 * | 12/2004 | Gulick | ........................ | 710/306 |
| 6,925,532 B2 * | 8/2005 | Fujibayashi et al. | ......... | 711/114 |
| 7,099,949 B1 * | 8/2006 | Vanhoof et al. | ............. | 709/230 |
| 7,117,419 B2 * | 10/2006 | Nemawarkar et al. | ....... | 714/758 |
| 2002/0161988 A1 | 10/2002 | Barlow et al. | | |
| 2002/0169938 A1 * | 11/2002 | Scott et al. | ................... | 711/207 |
| 2002/0174318 A1 * | 11/2002 | Stuttard et al. | ................ | 712/13 |
| 2003/0103490 A1 | 6/2003 | Noel, Jr. et al. | | |
| 2003/0120896 A1 | 6/2003 | Gosior et al. | | |
| 2003/0217347 A1 | 11/2003 | Meyer et al. | | |
| 2004/0215987 A1 * | 10/2004 | Farkas et al. | ................. | 713/300 |
| 2004/0225863 A1 * | 11/2004 | Yamashita | ..................... | 712/1 |
| 2005/0080954 A1 * | 4/2005 | Castro et al. | ................... | 710/52 |
| 2005/0080999 A1 * | 4/2005 | Angsmark et al. | .......... | 711/150 |
| 2006/0076827 A1 * | 4/2006 | Albright et al. | ............. | 303/123 |

(Continued)

OTHER PUBLICATIONS

Microsoft's Computer Dictionary, Fifth Edition, 2002, pp. 182.*

(Continued)

*Primary Examiner*—Eddie P Chan
*Assistant Examiner*—William B Partridge
(74) *Attorney, Agent, or Firm*—Trop, Pruner & Hu, P.C.

(57) ABSTRACT

In one embodiment, the present invention includes a processor having multiple processor cores to execute instructions, with each of the cores including dedicated digital interface circuitry. The processor further includes an analog interface coupled to the cores via the digital interface circuitry. The analog interface may be used to communicate traffic between a package including the cores and an interconnect such as a shared bus coupled thereto. Other embodiments are described and claimed.

16 Claims, 3 Drawing Sheets

U.S. PATENT DOCUMENTS

2006/0095750 A1* 5/2006 Nye et al. .................. 712/240
2007/0067483 A1* 3/2007 Fallon ....................... 709/231
2007/0130445 A1* 6/2007 Lau et al. ..................... 712/11

OTHER PUBLICATIONS

U.S. Appl. No. 11/087,914, filed Mar. 22, 2005, entitled "System and Method to Reduce Memory Latency in Microprocessor Systems Connected With a Bus" by Bryan I. Spry, Harris D. Joyce, Balaji P. Ramamoorthy, and Jeffrey D. Gilbert.

Chinese Patent Office, First Office Action dated Sep. 25, 2009 in a related application.

* cited by examiner

COMMON ANALOG INTERFACE FOR MULTIPLE PROCESSOR CORES

BACKGROUND

Embodiments of the present invention relate to semiconductor devices, and more particularly to interfacing semiconductor devices with system-level interconnect structures.

Today's semiconductor devices feature ever-increasing processing capabilities in smaller packages, and continue to operate at higher frequencies. Higher processing speeds and reduced size can lead to various issues, including power and temperature-related issues. Accordingly, many processors are now being manufactured that include multiple cores in a single package, and even multiple cores on a single die. Such processors can perform high-level processing tasks at lower temperatures, reducing heat dissipation. Furthermore, greater amounts of processing can be done at lower frequencies using multiple cores.

However, integrating multiple cores in a single package such as a processor socket can lead to various issues. One such issue is the effect of multiple cores on electrical performance. Specifically, multiple cores, each of which includes digital logic circuitry as well as analog input/output (I/O) interface circuitry, create a significant electrical load on an interconnect medium through which the processor socket is coupled to a system. For example, many computer systems include a system bus, often referred to as a front side bus (FSB), that is a multi-drop bus used to couple the processor to other system components, such as a memory controller hub (MCH), system memory, and other system components. To avoid negative electrical performance issues, the FSB may be controlled to run at a lower frequency, affecting performance. Such a lower bus frequency can significantly impact performance for dual core or other multiple core devices, as bandwidth demand can increase in proportion to the number of cores.

Some dual core processor designs connect cores together in a package in a manner similar to routing between multiple processor sockets in a multiple processor system. However, such a design degrades electrical performance of the FSB. In particular, the package trace length is significantly increased and capacitance is also increased, which can significantly limit I/O frequency. Other manners of connecting cores can cause significant design efforts that increase complexity and affect a base core design.

DETAILED DESCRIPTION

In various embodiments, multiple cores may be connected within a package with minimal impact on both core design and I/O frequency. Specifically, by presenting a single load to a system bus, the frequency impact of multiple cores may be minimized. In the embodiments described herein, a single load may be achieved by digitally combining bus signals of multiple cores on a single die (i.e., of a processor socket) and driving the combination out to the system bus via a common analog interface. To obtain the combination, digital interface logic coupled between the cores and the common analog interface may act, in effect, as a wired OR circuit.

In some systems, a system bus using gunning transceiver logic (GTL+) signaling technology may be used to couple system components together. Such a system bus may logically act as a wired OR bus. By moving the wired OR logic into digital circuitry interfacing the multiple cores with a common analog interface of a processor socket, improved electrical performance and ease of implementation can be realized. That is, only a single electrical load is seen by the system bus, and minimal or no changes to a base core design are needed to handle the combining of core inputs and outputs. Accordingly, there is minimal effect on the cores' pipelines, speed paths or logical operation.

Figure 1:
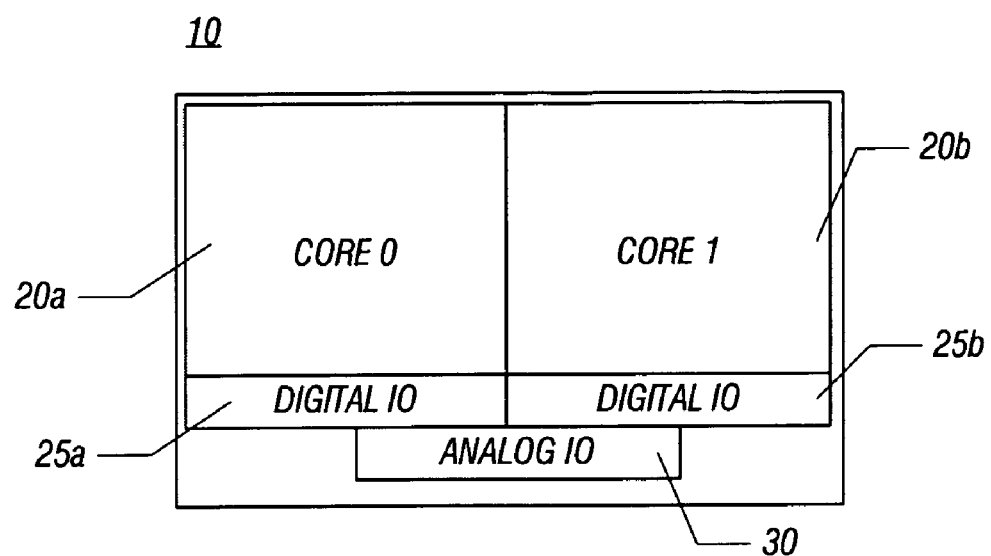
FIG. 1 is a block diagram of a processor in accordance with one embodiment of the present invention.

Referring now to FIG. 1, shown is a block diagram of a processor in accordance with one embodiment of the present invention. More specifically, as shown in FIG. 1 processor socket 10 may be a dual core processor including a first core 20a (i.e., core zero) and a second core 20b (i.e., core 1). Generically, a core of processor socket 10 may be referred to herein as core 20. While shown with only two cores in the embodiment of FIG. 1, it is to be understood that the scope of the present invention is not so limited and in other embodiments additional cores may be present in a given processor.

Each core 20 may include all logic and resources for the given core such as pipeline resources, execution units, cache memories, register files and other such structures. Furthermore, each core 20 may include its own dedicated digital I/O interface, respectively a digital I/O 25a and a digital I/O 25b (generically, digital I/O 25). As described further below, digital I/O 25 may include various logic circuitry to provide an interface for signals between the associated core and an analog I/O interface of a processor. In various embodiments, digital I/O 25 may include all bus control logic for its associated core (as if it were the only core present). In other words, each digital I/O 25 is a bus controller for its associated core 20. Thus, as shown in FIG. 1, each core 20 includes all core logic, as well as digital interface circuitry. Further it is to be understood that first core 20a and second core 20b may be identical or at least substantially identical. Accordingly, a single core design can be used and replicated to create a package having two or more cores with the same circuitry and functionality. In other embodiments, first core 20a and second core 20b may be differing types of cores such as heterogeneous core designs. In this way, the logic of different cores may be vastly different, so long as each corresponding digital I/O 25 is substantially similar. Such heterogeneous cores may both implement a compatible bus protocol, e.g., an FSB protocol.

However, each core 20 lacks dedicated analog interface circuitry. Instead, a common analog I/O interface (analog I/O) 30 may be present and used to couple signals from both cores 20a and 20b to and from an interconnect to which processor socket 10 is coupled. This common analog interface between multiple cores and an interconnect, e.g., a bus to which the processor is coupled, may improve signaling latency and ease of design when integrating a multicore processor into a system using a shared bus such as a front side bus. While not shown in the high-level view of FIG. 1, it is to be understood that some additional (i.e., common) digital interface circuitry may be provided between digital I/O 25 and analog I/O 30 to route signals between a given core and analog I/O 30.

While described with this particular implementation in FIG. 1, it is to be understood that the scope of the present invention is not so limited. That is, in various embodiments different forms of dedicated processor circuitry may be present for multiple cores, with a single set of analog circuitry present to provide an interface to a bus or other interconnect for the multiple cores. In this way, the electrical load seen by the interconnect is minimized, i.e., corresponding to that of a single core. As a result, the interconnect can operate at the same frequency as it would if only a single core processor were present in a processor socket. Furthermore, design complexity is reduced, as no additional logic circuitry is needed within the cores to enable connection of multiple cores. Furthermore, overall die circuitry is reduced, as only a single set of analog interfaces is implemented.

Figure 2:
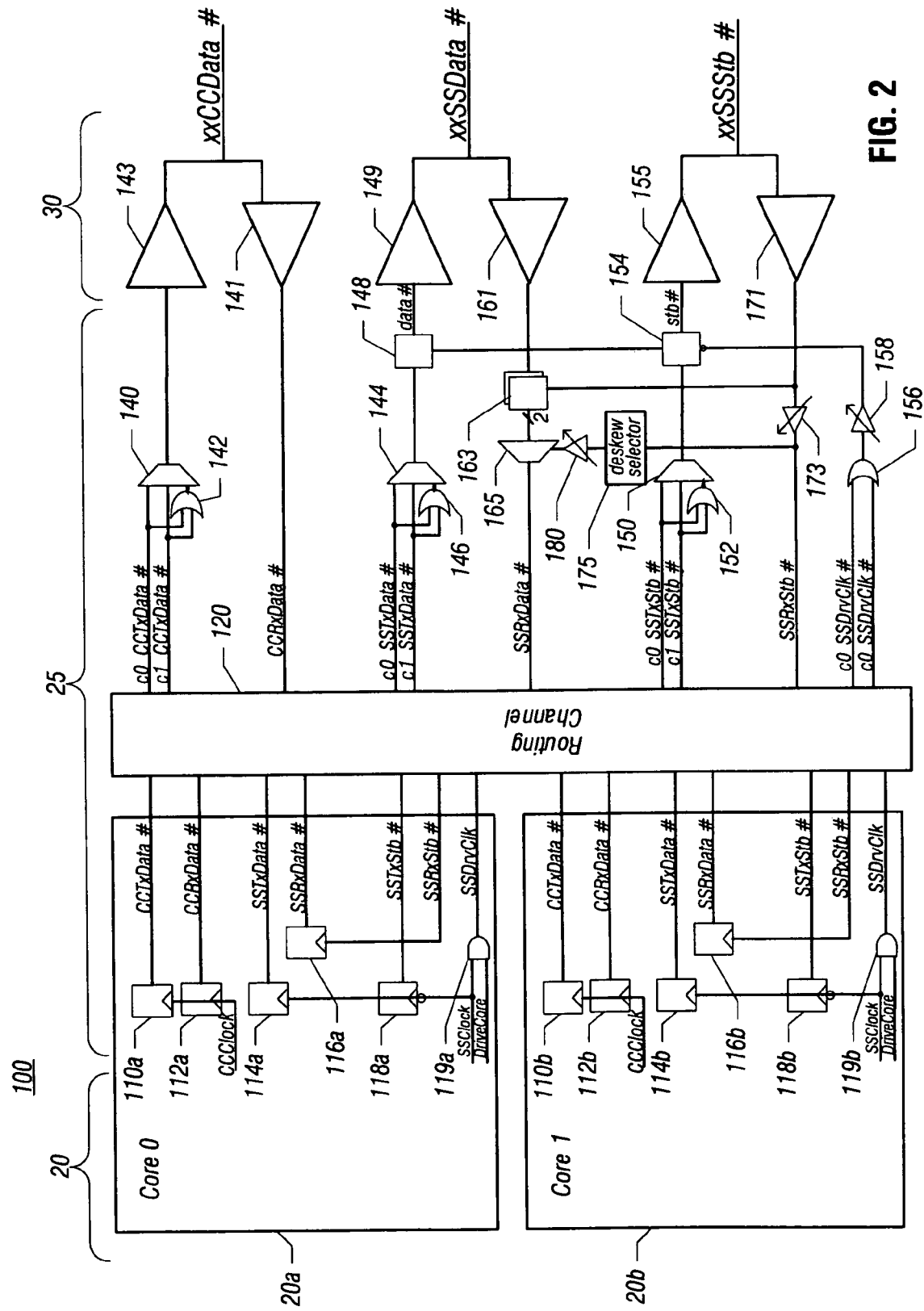
FIG. 2 is a schematic diagram of a processor in accordance with one embodiment of the present invention.

Referring now to FIG. 2, shown is a schematic diagram of a processor in accordance with one embodiment of the present invention. More specifically, as shown in FIG. 2, a processor 100 may be a dual core processor that includes cores 20a and 20b. Note that usage of the same reference numerals in FIGS. 1 and 2 indicates presence of the same components. As shown in the reference numerals at the top of FIG. 2, processor 100 may be broken down into a core portion 20, a digital I/O portion (also referred herein as digital portion) 25, and an analog I/O portion (also referred herein as analog portion) 30. Core portion 20 may be dedicated portions of logic and circuitry used to form the individual cores. Furthermore, digital I/O portion 25 may include some amount of dedicated circuitry in each of cores 20a and 20b, and some amount of additional interface logic coupled between cores 20a and 20b and analog I/O portion 30. As further shown in FIG. 2, analog portion 30 may be a single common analog interface to provide coupling between multiple cores 20a and 20b and an off-chip bus or other interconnect.

As shown in FIG. 2, core 20a includes various digital circuitry which may be part of digital portion 25 for use in interfacing between the core logic and a routing channel 120. Various digital circuitry may be present for each of multiple signal lines corresponding to transmit data, receive data and strobe signals, in addition to drive clock signal lines. Specifically, shown in FIG. 2, core 20a may include a flip-flop 110a clocked by a common clock signal (CCClock) for each common clock data line for transmission of data and a corresponding flip-flop 112a similarly clocked for each common clock data line for data to be received. While the scope of the present invention is not limited in this regard, in some embodiments 16 common clock signal lines may be present in each of transmit and receive directions. As shown in FIG. 2, outgoing common clock data lines may be enumerated as CCTxData#, while incoming common clock data lines may be referred to CCRxData#. Note that the # symbol after a signal name used to indicate an active-low logic signal, indicating a signal is in the active state when driven to a low level, however, such active-low logic levels are for illustration purposes and the scope of the present invention is not limited in this regard.

Core 20a may further include a flip-flop 114a coupled to provide source synchronous data to be transmitted on an associated source synchronous transmit data line (i.e., SSTxData#). Similarly, incoming source synchronous data may be received along a source synchronous receive data line (i.e., SSRxData#) via a storage device such as a first-in-first-out (FIFO) 116a. Note that such a source synchronous path may improve performance by transmitting data multiple times per bus clock (e.g., 4×). In addition, core 20a may further include a flip-flop 118a that is coupled to provide data to a source synchronous transmit strobe line (i.e., SSTxStb#). Note that flip-flops 114a and 118a may be clocked in opposing relation by a source synchronous clock (i.e., SSClock). In turn, the source synchronous clock and a drive core signal (DriveCore) may be coupled to a logic gate 119a that in turn is coupled to provide a drive clock signal, namely a source synchronous drive clock signal (i.e., SSDrvClk). Note that similar circuitry to that discussed above is present in core 20b (shown with the same reference numerals and the designator "b").

Each of these above-discussed signal lines may be coupled to routing channel 120 which in turn provides signals to and from additional digital logic within digital portion 25. Routing channel 120 may include amplifiers, repeaters and the like. Such additional logic within digital portion 25 may provide for selection of an active one of cores 20a and 20b for transmission/receipt of data via the signal lines. Accordingly, routing channel 120 may include circuitry to route signals to/from cores 20a and 20b from/to selected signal lines in digital portion 25. In the transmit direction, common clock transmit signals (i.e., c0CCTxData# or c1CCTxData#) from both cores may be coupled to a multiplexer 140 that is controlled by design for test (DFT)/control register-related signals (not shown in FIG. 2). Such DFT signals may allow the dual core processor to be converted into a single core for test or debug purposes. However, by default and in normal operation, multiplexer 140 may select the output of logic gate 142. Logic gate 142 may emulate or act as a logical equivalent of a wired OR bus such as a GTL-signaling based-bus, as logic gate 142 may act as an OR gate in an active-low signaling embodiment. In turn, the selected data line may be passed to analog portion 30, and more particularly to an analog buffer 143, which buffers the digital signal to an appropriate level for transmission along an interconnect to which processor 100 is coupled, e.g., a bus. Accordingly, desired data may be transmitted along a common clock data line of the bus (e.g., xxCCData#). Incoming common clock data signals received via xxCCData# lines may be coupled via an input buffer 141 and provided along a common clock receive data line (i.e., CCRxData#) to routing channel 120. From routing channel 120, the data may be passed to either flip-flop 112a or flip-flop 112b, based on the selected core. Alternatively, incoming signals may be delivered to all cores with the cores themselves determining if they are to process the signals.

Referring still to FIG. 2, source synchronous data to be transmitted from one of cores 20a and 20b may be routed through routing channel 120 and provided via a given core's line to a multiplexer 144 (i.e., c0SSTxData# or c1SSTxData#). Furthermore, these lines are coupled to a logic gate 146 which operates as discussed above with respect to logic gate 142. The selected data from multiplexer 144 is passed to a latch 148. When clocked by a source synchronous driver clock, latch 148 passes the data out of digital portion 25 and to a buffer 149 of analog portion 30. In this way, a given source synchronous data line (i.e., xxSSData#) may have a signal transmitted thereon.

For incoming source synchronous data to processor 100 from a bus, the data is coupled through a buffer 161 and is provided to a selected latch 163. The operation of latch 163 may be controlled by an incoming source synchronous strobe signal (i.e., SSRxStb#). When latched through, data is passed to a multiplexer 165 and is provided to routing channel 120 as the source synchronous receive data (i.e., SSRxData#). As shown in FIG. 2, multiplexer 165 may be controlled based on the incoming source synchronous strobe signal that is provided through a variable delay inverter 173, a deskew selector 175, and another variable delay inverter 180. Based on the core for which the data is intended, routing channel 120 will pass the source synchronous receive data to either FIFO 116a or 116b. Alternatively, and as with the common clock signals described previously, source synchronous received data may be delivered to both FIFOs 116a and 116b. As shown in FIG.

2, these FIFOs are controlled by the incoming source synchronous receive strobe signal, also routed through routing channel 120.

Still referring to FIG. 2, source synchronous transmit strobe signals may be generated in cores 20a and 20b and provided through routing channel 120 to a multiplexer 150 and an associated logic gate 152. Specifically, each core may generate source synchronous strobe signals provided to multiplexer 150 via source synchronous transmit strobe lines (i.e., c0SSTxStb# and c1SSTxStb#). The selected strobe signal is provided from multiplexer 150 and a latch 154 that in turn is clocked by a source synchronous drive clock signal, which is derived from incoming source synchronous drive clock signals (i.e., c0SSDrvClk# and c1SSDrvClk#) from a given core through routing channel 120 and through an OR gate 156 and a variable delay inverter 158. The selected source synchronous strobe signal is latched through latch 154 and provided to a buffer 155 for transmission along the bus as a source synchronous strobe signal (i.e., xxSSStb#). In turn, incoming strobe signals along the source synchronous strobe lines are provided to a buffer 171, which in turn is passed through a variable delay inverter 173 and provided to routing channel 120 along a source synchronous receive strobe line (i.e., SSRxStb#). In turn, the source synchronous strobe signal is provided through routing channel 120 to control a selected one of FIFOs 116a and 116b. While described with this particular implementation in the embodiment of FIG. 2, it is to be understood that the scope the present invention is not limited in this regard, and other implementations of providing a common analog interface for multiple cores of a processor such as a dual core processor can be realized.

Figure 3:
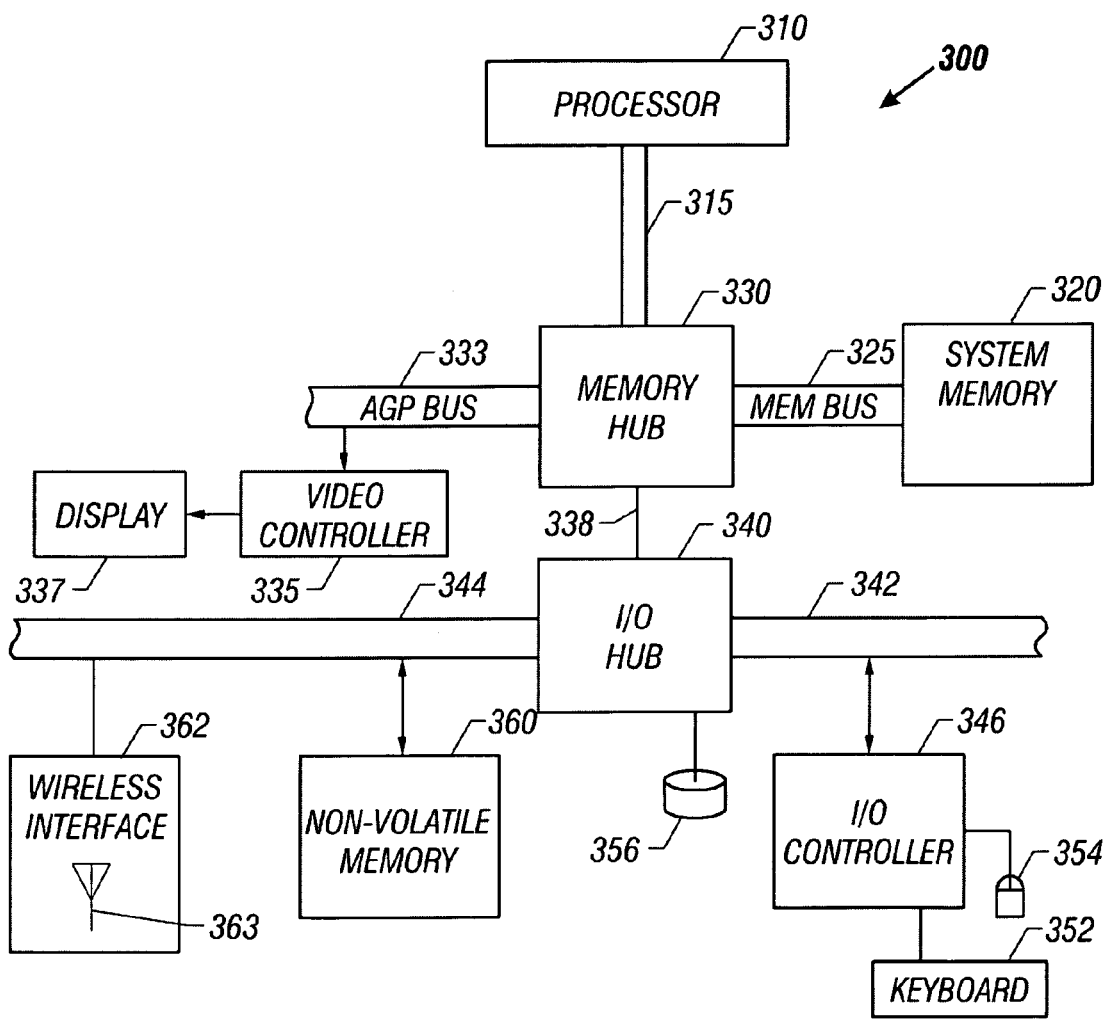
FIG. 3 is a block diagram of an exemplary processor-based system with which embodiments of the invention may be used.

FIG. 3 is a block diagram of an exemplary processor-based system with which embodiments of the invention may be used. As used herein, the term "system" may be any type of processor-based system, such as a mainframe computer, a desktop computer, a server computer, a laptop computer, a portable device, an appliance, a set-top box, or the like. System 300 includes a processor 310, which may be a general-purpose or special-purpose processor. In an embodiment of the present invention, processor 310 may be a multicore processor, e.g., a dual core processor. Furthermore, processor 310 may include a common analog interface to enable reduced electrical load, in addition to ease of porting a single core design into a multicore processor.

In one embodiment, processor 310 may be coupled over a front side bus 315 to a memory hub 330, which, in turn, may be coupled to a system memory 320, which may be a dynamic random access memory (DRAM) in one embodiment, via a memory bus 325. While not shown in the embodiment of FIG. 3, it is to be understood that in various embodiments, additional multicore or other such processors may be coupled to front side bus 315. Memory hub 330 may also be coupled over an Advanced Graphics Port (AGP) bus 333 to a video controller 335, which may be coupled to a display 337. AGP bus 333 may conform to the Accelerated Graphics Port Interface Specification, Revision 2.0, published May 4, 1998, by Intel Corporation, Santa Clara, Calif.

Memory hub 330 may also be coupled (via a hub link 338) to an input/output (I/O) hub 340 that is coupled to a first bus 342 and to a second bus 344. First bus 342 may be coupled to an I/O controller 346 that controls access to one or more I/O devices. As shown in FIG. 3, these devices may include in one embodiment input devices, such as a keyboard 352 and a mouse 354. I/O hub 340 may also be coupled to, for example, a hard disk drive 356. It is to be understood that other storage media may also be included in system 300.

Second bus 344 may also be coupled to various components including, for example, a non-volatile memory 360 such as a flash memory and a wireless interface 362. Wireless interface 362 may be used in certain embodiments to communicate with remote devices. As shown in FIG. 3, wireless interface 362 may include a dipole or other antenna 363 (along with other components not shown in FIG. 3). Of course, additional devices may be coupled to first bus 342 and to second bus 344. Although the description makes reference to specific components of system 300, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a processor socket including:
    a first processor core adapted on a semiconductor die to execute instructions, the first processor core including first digital interface circuitry;
    a second processor core adapted on the semiconductor die to execute instructions, the second processor core including second digital interface circuitry;
    an analog interface coupled to the first processor core via the first digital interface circuitry and to the second processor core via the second digital interface circuitry, the analog interface to communicate bus traffic between the processor socket and a computer system bus coupled thereto, the analog interface including buffer circuitry to buffer digital signals to a level for transmission along a common clock data line of the computer system bus, the interface to present a single electrical load from the first and second processor cores to the interconnect; and
    a common digital interface logic coupled between the first and second digital interface circuitries and the analog interface, the common digital interface logic including a multiplexer to select the bus traffic from the first processor core or the second processor core for communication on the interconnect, wherein the multiplexer has a first input to receive data of the first core, a second input to receive data of the second core, and a third input to receive an output of selection logic coupled to receive the data of the first core and the data of the second core and to emulate a wired OR bus, the multiplexer to select the data from the first input or the second input during a test mode and to select the output of the selection logic from the third input during a normal operation mode.

2. The apparatus of claim 1, wherein the first processor core and the second processor core comprise substantially identical circuitry.

3. The apparatus of claim 1, wherein the first processor core and the second processor core comprise heterogeneous cores, wherein the first digital interface circuitry and the second digital interface circuitry are substantially similar.

4. The apparatus of claim 1, wherein the common digital interface logic comprises a router to route the traffic along a common clock path or a source synchronous path.

5. The apparatus of claim 4, wherein the common digital interface logic further comprises a strobe path, wherein the strobe path and the source synchronous path are controlled by a common drive clock signal.

6. The apparatus of claim 4, wherein the source synchronous path comprises: a first latch to receive incoming data for the first processor core and a second latch to receive incoming data for the second processor core, the first and second latches controllable by an incoming strobe signal; and a second multiplexer coupled to the first and second latches, the second multiplexer controllable by a deskew selector, the deskew selector controllable by the incoming strobe signal.

7. The apparatus of claim 1, wherein the first digital interface circuitry comprises a bus controller for the first processor core and the second digital interface circuitry comprises a bus controller for the second processor core.

8. A system comprising:
a multicore processor including a first core having a first digital interface, a second core having a second digital interface, common digital interface logic coupled between the first and second digital interfaces, respectively, and a common analog interface, the common digital interface logic including a multiplexer having a first input to receive data of the first core and a second input to receive data of the second core and to select the data of the first or second core for transmission on a front side bus (FSB) during a test mode, the multiplexer further having a third input to receive an output of a logic gate that receives the data of the first and second cores and emulates a wired OR bus, the common analog interface including buffer circuitry to buffer digital signals to a level for transmission on the FSB, the common analog interface to minimize an electrical load presented to the FSB so that the FSB can operate at a frequency it would operate at if only a single core was present;
a dynamic random access memory (DRAM); and
the FSB to couple the multicore processor to the DRAM.

9. The system of claim 8, wherein the multicore processor comprises a single semiconductor substrate including the first and second cores, the first and second digital interfaces and the common analog interface.

10. The system of claim 8, wherein the FSB is further coupled to a second multicore processor.

11. The system of claim 8, wherein the common analog interface is to present a single electrical load from the first core and the second core to the FSB.

12. The system of claim 8, wherein the common analog interface is to communicate along a common clock path; a source synchronous path, and a strobe path, the strobe path associated with the source synchronous path.

13. A method comprising:
providing data of a first core of a multiple core processor package to a common multiplexer;
providing data of a second core of the multiple core processor package to the common multiplexer;
selecting, under control of a first control signal in a test mode, the data of the first core or the data of the second core;
selecting, under control of a second signal in a normal operation mode, the data of the first core or the data of the second core output by a logic gate of a common digital interface of the multiple core processor package coupled between the first and second cores and an output of the multiple core processor package, the logic gate having an output coupled to the common multiplexer and to emulate a wired OR bus; and
routing the selected data from the common multiplexer to a shared bus corresponding to the wired OR bus.

14. The method of claim 13, further comprising providing the data of the first core to the common multiplexer via a first bus controller of the first core and providing the data of the second core to the common multiplexer via a second bus controller of the second core.

15. The method of claim 13, further comprising combining the data of the first core and the data of the second core in the logic gate.

16. The method of claim 13, further comprising providing data of a third core to the common multiplexer and selecting the data of the first core or the second core or the third core for output from the common multiplexer.

* * * * *